Feb. 28, 1961 T. F. KOCH 2,972,881
SEALING FRICTION TESTING APPARATUS
Filed Oct. 23, 1956 4 Sheets-Sheet 2

INVENTOR.
Theodore F. Koch
BY
Cromwell, Greist & Warden
Atty.

Feb. 28, 1961 T. F. KOCH 2,972,881
SEALING FRICTION TESTING APPARATUS
Filed Oct. 23, 1956 4 Sheets-Sheet 3
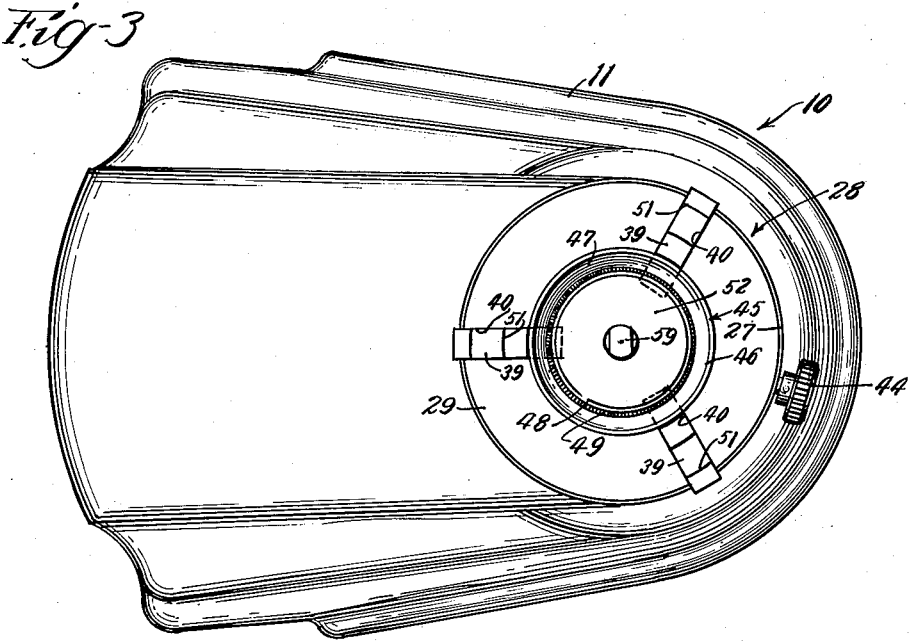
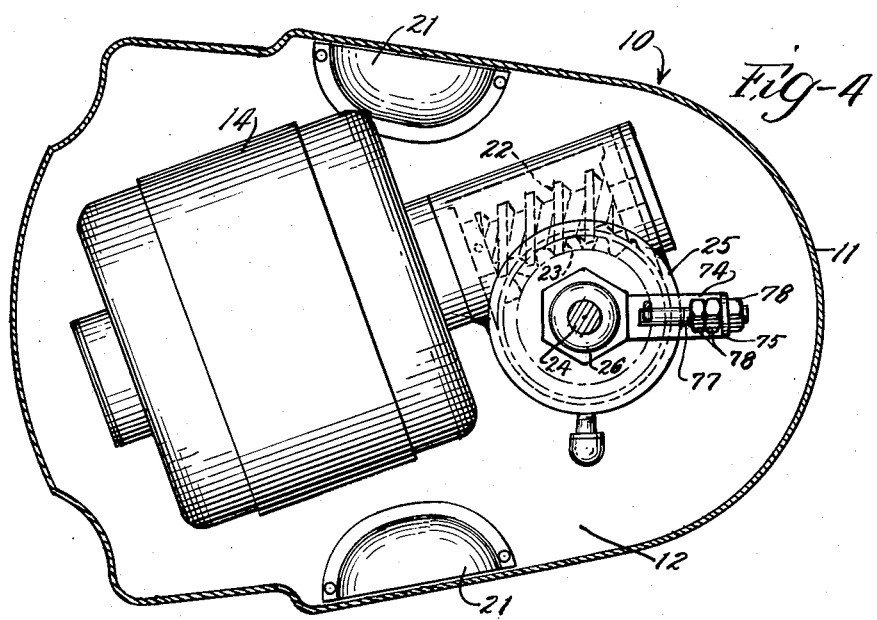
INVENTOR.
Theodore F. Koch
BY
Cromwell, Greist & Warden
Attys.

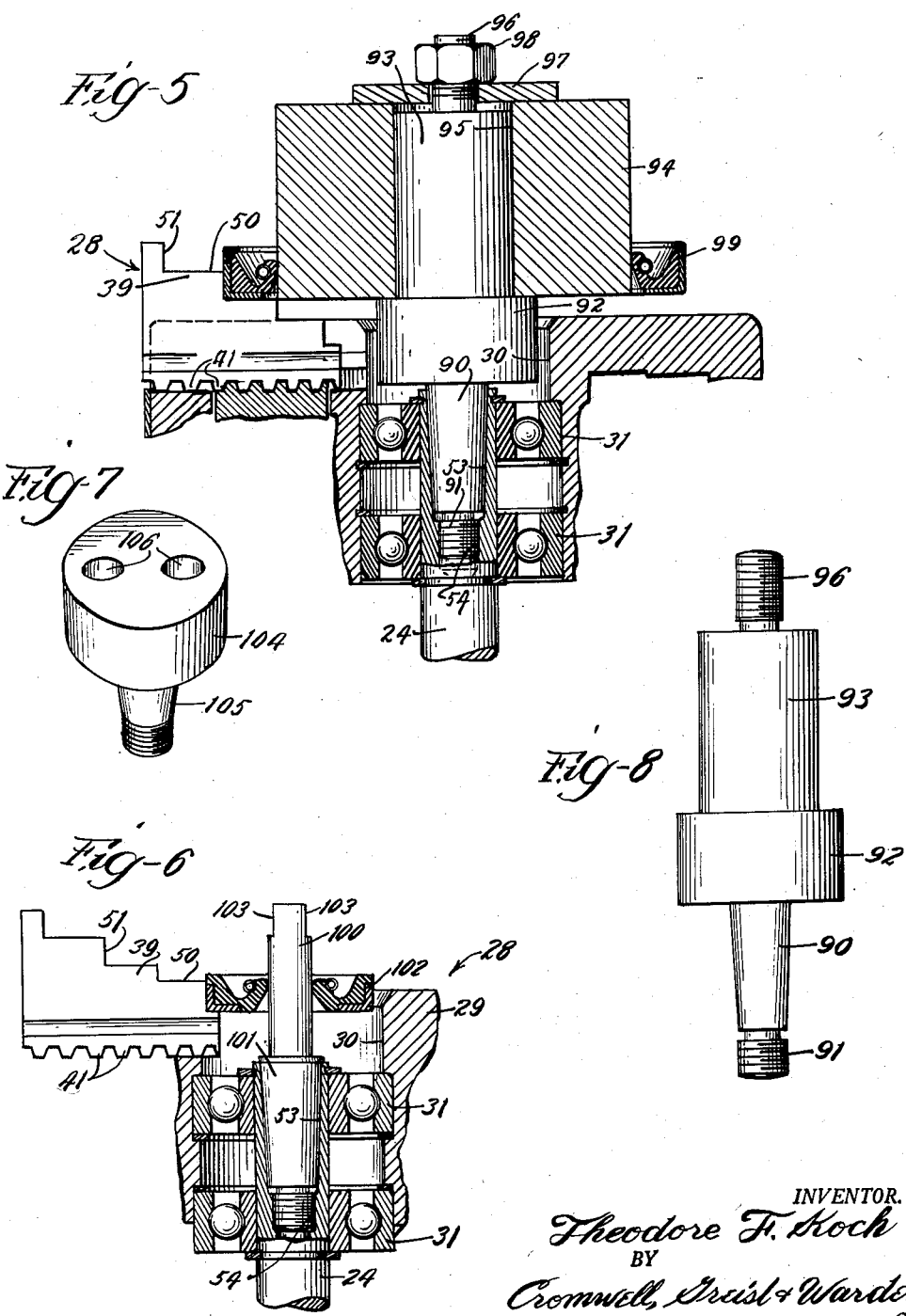

United States Patent Office 2,972,881
Patented Feb. 28, 1961

2,972,881

SEALING FRICTION TESTING APPARATUS

Theodore F. Koch, Elmhurst, Ill., assignor to Chicago Rawhide Manufacturing Company, Chicago, Ill., a corporation of Illinois Filed Oct. 23, 1956, Ser. No. 617,863

9 Claims. (Cl. 73—9)

The present invention is directed to a new and improved testing apparatus particularly adapted for use in determining the frictional torque of radial shaft-type oil seals for quality control or other manufacturing, inspection or development purposes.

It is an object of the present invention to provide a new and improved sealing friction testing apparatus of uncomplicated and low cost design which is adapted for rapid and convenient operation in measuring torque developed by test objects held in engagement with a rotatable shaft, or turned by the rotatable shaft, the measurements being directly readable from the apparatus.

Another object is to provide a new and improved frictional torque measuring apparatus particularly adapted for use in measuring the frictional sealing engagement established by a radial type oil seal with a rotatable shaft forming a part of the apparatus, the apparatus including seal-holding means concentrically arranged with respect to the rotatable shaft which is readily accessible for quick and convenient vertical loading and unloading, the seal-holding means being carried by the apparatus in such a manner as to provide greater inherent accuracy in obtaining frictional torque measurements, the seal being mountable relative to the shaft to more easily achieve actual seal operating conditions thereby further enhancing the accuracy of the frictional torque measurements obtained by use of the apparatus.

Still another object is to provide an improved form of frictional torque measuring apparatus of the type described above wherein a torsion spring of a low cost, readily available commercial variety may be used in measuring the frictional torque of a test object while obtaining improved accuracy, the torsion spring being utilized to resist rotational movement of a test object holding means which is preferably in the form of a chuck concentrically received about a rotatable test shaft, the ends of the torsion spring being held by means which are adjustable for calibration purposes to eliminate the need of the use of expensive pre-calibrated precision springs and further adapt the apparatus for a wider range of use, the accuracy of the measurements provided by the apparatus being further enhanced by the utilization of dynamic frictional forces in the operation of the apparatus for which compensation by adjustment may be more readily and more easily made, the actual frictional torque measurements being directly readable from a scale carried by the apparatus.

Other objects not specifically set forth will become apparent from the following detailed description made in conjunction with the drawings wherein:

Fig. 3 is a top plan view of the testing apparatus on reduced scale;

Fig. 4 is a sectional view of the apparatus on reduced scale taken generally along line 4—4 of Fig. 2;

Fig. 5 is an enlarged fragmentary view in partial section illustrating one form of test shaft adaptor for use with the testing apparatus mounted in its operative position;

Fig. 6 is a view similar to Fig. 5 illustrating another form of test shaft adapted for use with the testing apparatus;

Fig. 7 is a perspective view of still another form of test shaft; and

Fig. 8 is an elevation of the test shaft adaptor shown in Fig. 5.

Figure 1:
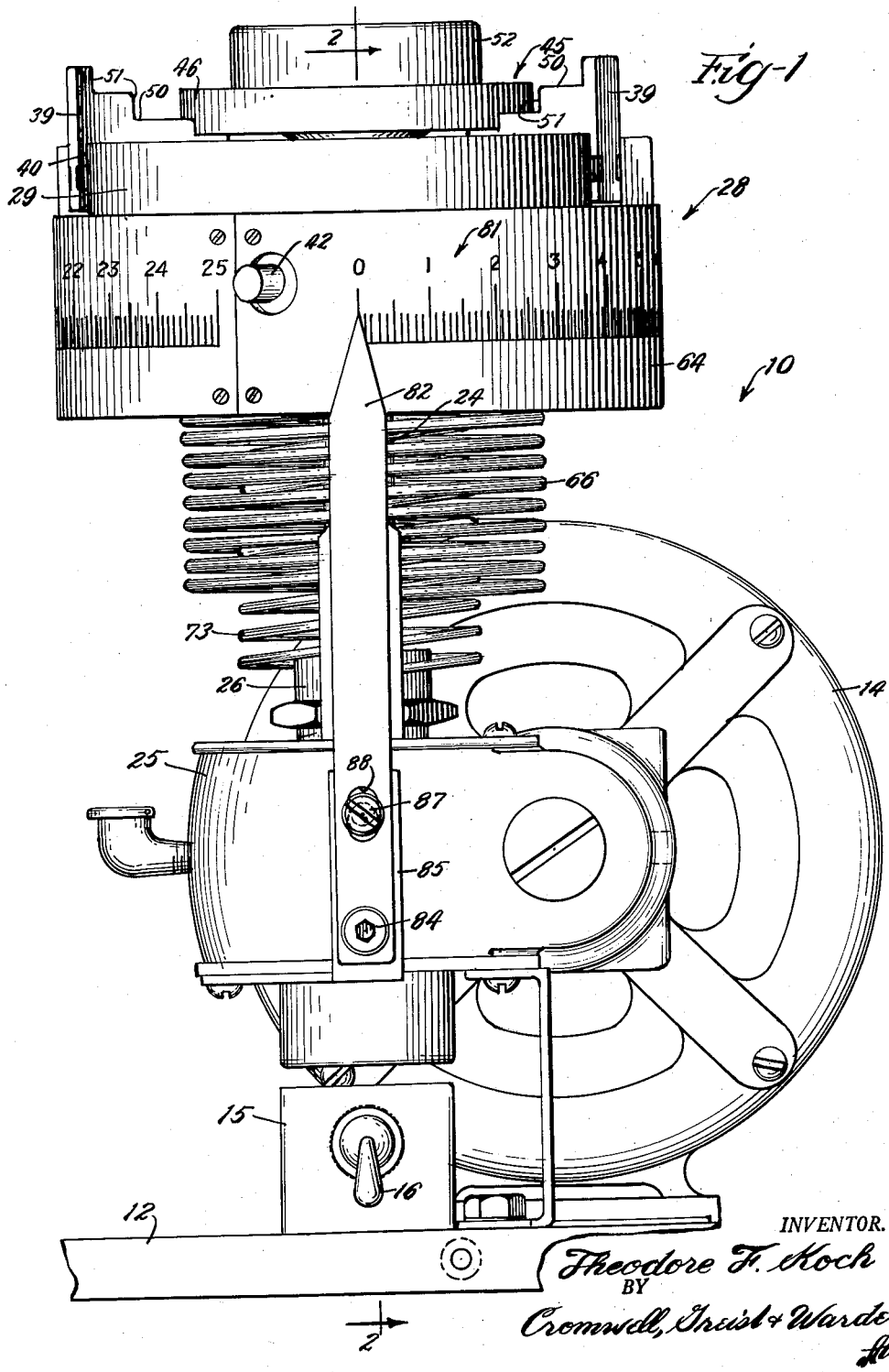
Fig. 1 is a front elevation of the testing apparatus with its housing removed and its supporting base fragmentarily shown.
Figure 2:
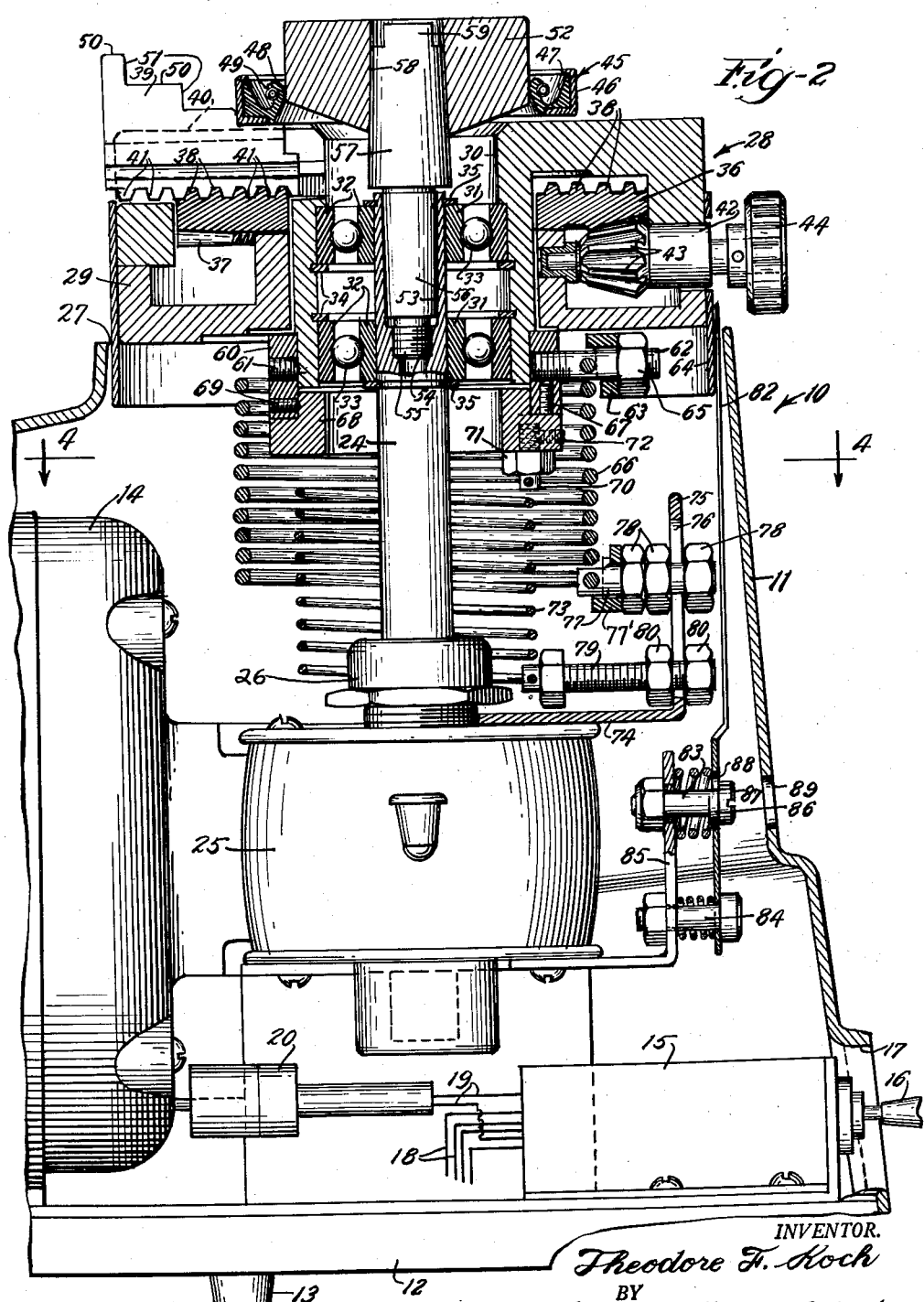
Fig. 2 is a partial vertical section of the apparatus having portions of its housing and supporting base fragmentarily shown and being taken generally along line 2—2 of Fig. 1.

Referring to Figs. 1–4 a testing apparatus 10 is shown as including a housing 11 carried on a supporting base 12 provided with spaced bottom supports 13 (see Fig. 2). Mounted on the horizontally extending support 12 is an electric motor 14, the operation of which is controlled by a switch 15 provided with an operating lever 16 which extends outwardly of the housing 11 through a side opening 17 therein. As particularly shown in Fig. 2, electrical leads 18 connect the switch 15 with a suitable source of power externally of the apparatus 10 and further leads 19 interconnect a fuse 20 between the motor 14 and switch 15. The housing 11 is suitably attached to the support 12 and, as shown in Fig. 4, the support carries laterally spaced handles 21 positioned adjacent side openings in the housing 11, the handles 21 being adapted for grasping when it is desired to move the apparatus 10 from one location to another. The over-all size and weight of the apparatus 10 is such that it is readily portable thereby adapting the apparatus for use under varying conditions.

Referring particularly to Fig. 4, the driven shaft of the motor 14 is provided with a worm gear 22 which is drivingly engaged with a gear 23 carried about a shaft 24 within a gear housing 25. Referring particularly to Fig. 2, the shaft 24 extends upwardly in a vertical direction from the gear housing 25 and is received through a shaft sealing portion 26 of known type and design.

The top portion of the housing 11 is provided with an opening 27 which has received therein a test object holding means generally designated by the numeral 28 which is in the form of a known type of chuck and which is concentrically mounted with respect to the shaft 24. The chuck 28 is formed from an annular ring-like body portion 29 provided with a centrally located bore 30 received about the upper end of the shaft 24 and carried thereby through a series of vertically spaced ball bearings 31. The bearings 31 are of a known type and are provided with spaced sleeves 32 concentrically received one within the other to form an inner and outer race separated by spaced balls 33. Snap rings 34 fix the outer race of each of the bearings 31 relative to the body portion 29 of the chuck 28 and snap rings 35 fix the inner race of each of the bearings 31 relative to the shaft 24. Consequently, the chuck 28 is concentrically mounted on the shaft 24 and the weight of the same is carried by the shaft while the bearings 31 allow the chuck 28 to rotationally move independently of the shaft 24.

The body portion 29 of the chuck 28 has received internally thereof an annular sprocket gear 36 which is provided with a ring of circumferentially spaced inclined teeth 37 on the bottom surface thereof, the top surface being provided with thread-like projections 38 for threadedly advancing in a radial direction a series of spaced clamping or locking jaws 39 received in radial grooves 40 in the top surface of the body portion 29. The jaws 39 have cooperating segmental threads 41 along the bottom surface thereof which are meshed with the thread-like projections 38 of the ring member 36. The body portion 29 of the chuck 28 is further provided with an operating stud 42 suitably journalled therein and provided with inwardly convergent teeth 43 cooperating with the circumferentially spaced teeth 37 of the ring 36. The outermost end of the operating stud 42 is provided with a knob 44 positioned outwardly of the body portion 29 of the chuck 28 and above the housing 11. Turning of the knob 44 rotates the flat ring 36 and either advances the jaws 39 toward the center of the body portion 29 or away from the center thereof in radial directions depending upon the direction of rotation of the knob 44.

The chuck 28 operates in a known manner in conformance with general operating principles of known types of chucks, the purpose of this element being to move the jaws 39 thereof into clamping or holding relation with a conventional type of radially acting oil seal generally designated by the numeral 45 and, as illustrated, comprising an annular casing member 46 internally positioning an annular resilient sealing member 47 having a radially flexible sealing lip 48 provided with a constricting coil spring 49. The jaws 39 are provided with stepped portions 50 having vertical clamping faces 51 each of which accommodates an oil seal 45 of a different outer diameter to clamp the same and hold the seal against substantial rotation with a test shaft 52.

Referring particularly to Fig. 2, the upper end portion of the shaft 24 is centrally recessed to define an inverted cone-shaped bore 53. The innermost end of the bore 53 is provided with an axially extending tapped hole 54 which threadedly receives therein a clamping end portion 55 of an adaptor shank 56 which has an inverted cone shape to allow the same to be tightly received in wedged relation within the bore 53 of the shaft 24. The outermost end of the adaptor shank 56 is provided with an integral cone-shaped adaptor shank 57 of oppositely directed taper which has received thereabout the test shaft 52, the latter being provided with a cone-shaped central bore 58 which is adapted to be wedged onto the adaptor shank 57. The top surface of the adaptor shank 57 is provided with a flat sided upstanding nub 59 adapted to be held by a known type of wrench to apply a tightening or loosening torque to the shank 56 when the adaptor defined by the integral shanks 56 and 57 is threadedly mounted in the bore 53 of the shaft 24 and tightly wedged therein by the cooperating cone-shaped surfaces of the bore 53 and shank 56. The test shaft 52 is tightly wedged on the adaptor shank 57 and upon operation of the testing apparatus 10, including rotation of the shaft 24 in a clockwise direction, the adaptor shank 56 remains tightly held within the bore 53 by reason of the provision of cooperating left handed threads on the threaded portions 54 and 55.

The lower part of the body portion 29 of the chuck 28 carries a ring member 60 clamped thereto by a set screw 61. The outer surface of the body portion 29 is further provided with an annular skirt portion 64 fixed thereto. The ring 60 carries a threaded stud 62 received through a clamping washer 63 which clamps an end portion of a coil spring 66 passed through a hole in the studs 62. An adjustable nut 65 holds the washer 63 in clamping position on the stud 62. A set screw 67 fixes the stud 62 against turning within the tapped hole in the ring 60. The ring 60 is received about the top leg portion of an L-shaped ring 68 which is fixed thereto by a set screw 69. The ring 68 receives therein a vertically directed stud 70 which is clamped to the ring by a nut 71 and further held by a set screw 72. The lowermost portion of the stud 70 is provided with a drilled hole which fixedly receives therethrough the top free end of a spring 73 which is positioned concentrically within the spring 66 and about the shaft 24.

The top plate of the gear housing 25 has suitably attached thereto a bracket 74 which has an upstanding leg portion 75. The leg portion 75 is provided with a vertically extending slot 76 which receives therethrough a stud 77 held at a point along the slot 76 by oppositely positioned nuts 78. The innermost end of the stud 77 has a clamping washer 77' thereon held by one of the nuts 78 to clamp the bottom free end of the spring 66 received through a hole in the stud 77. Positioned below the stud 77 and extending through the slot 76 is a further stud 79 which is fixed at a point along the slot 76 by oppositely positioned nuts 80. The innermost end of the stud 79 has fixedly received therethrough the bottom free end portion of the inner spring 73. Thus the springs 66 and 73 are connected at their uppermost ends to the independently movable chuck 28 and at their lowermost ends with fixed attachment means which are fixed against movement with either the shaft 24 or the chuck 28.

As particularly shown in Fig. 1, the outer annular band portion 64 of the chuck 28 is provided with indicia, generally designated by the numeral 81, cooperating with an upwardly directed pointer arm 82. As shown in Fig. 2, the upper end of the arm 82 extends out of the top opening 27 of the housing 11 and the lower end of the same is mounted by vertically spaced bolts 83 and 84 to a bracket 85 which is suitably fastened to the bottom surface of the gear housing 25. The bolt 83 is provided with an eccentric shoulder 86 positioned immediately inwardly of the head 87 thereof and received within a flat sided, vertically enlarged opening 88 in the pointer arm 82. The head 87 and its kerf are accessible outwardly of the housing 11 through an opening 89 therein and by the insertion of a suitable type of screw driver the pointer arm 82 may be moved about its pivot point defined by the lowermost bolt 84. Rotation of the bolt 83 and its associated eccentric shoulder 86 results in movement of the pointer arm 82 to the right or left as viewed in Fig. 1 thereby allowing calibration of the same relative to the indicia 81 carried by the outer skirt portion 64 of the chuck 28.

In the operation of the testing apparatus 10, rapid and convenient, accurate frictional torque readings are obtained. The use of a vertical test shaft 52 mounted at a convenient working height with the chuck 28 mounted concentrically relative thereto makes it possible to load a test object or seal 45 on the shaft 52 and into the chuck 28 in a single movement. The outside diameter of the seal 45 will determine the particular vertical clamping surface 51 to be used with respect to each of the chuck jaws 39. A single twist of the knob 44 centers and clamps the seal 45 in the chuck 28 and the seal is held in operative engagement with the test shaft 52 in the same manner as expected in commercial use of the seal 45. The switch handle 16 is operated to start the motor 14 and rotate the shaft 24 and test shaft 52. As the test shaft 52 turns, the sealing friction established by the seal 45, which is tightly clamped by the jaws 39, tends to carry the seal 45 and the chuck 28 with the test shaft 52. The turning of the chuck 28 with the test shaft 52 is resisted by the torsion springs 66 and 73. The angular deflection of the springs 66 and 73 when they balance the sealing friction and prevent further rotation of the chuck 28 with the test shaft 52 is converted to frictional torque measurements by the calibrated scale 81 carried on the annular plate 64 about the outer periphery of the chuck 28. The pointer arm 82 is directly in front of the operator's eyes and its location relative to the scale 81 may be easily and accurately read in common decimal units with the values progressing from left to right as viewed in Fig. 1. After taking the reading the switch handle 16 is returned to its initial position thereby stopping the motor 14 and the test seal 45 is readily released from the chuck 28 by a single twist of the knob 44 and removed from the chuck 28 and test shaft 52 with a single movement.

Test shafts of any desired diameter may be readily fitted to the apparatus 10 as will be subsequently described. The testing apparatus 10 will accommodate oil seals 45 of variable outside diameter as well as variable cross sectional size. The scale 81 is preferably marked in tenths from 0 to 25 and the springs 73 and 66 preferably match the numbers of the scale to inch-ounces or inch-pounds. Standard measurements may be made at a constant speed of 57 revolutions per minute. However, springs of variable stiffness and motors of other speeds may readily be used. While motorization is preferred it is not essential.

As previously referred to, different forms of test shafts may be utilized thereby providing the apparatus 10 with a wide range of adaptability for testing the friction developed by different size oil seals. In Fig. 5 a different form of test shaft arrangement is illustrated wherein the shaft 24 receives a cone-shaped adaptor shank 90 in its cooperatively cone-shaped end recess 53 similarly as described in connection with the mounting of the test shaft 52 of Fig. 2. The adaptor shank 90 is provided with an integral threaded stud 91 at the bottom thereof which is received in the tapped hole 54 of the shaft 24. The uppermost end of the shank 90 has integrally formed therewith an annular shoulder portion 92 which is of greater diameter than that of the shank 90. Integrally attached to the top surface of the annular shoulder portion 92 is a shank 93 receiving thereabout a test shaft 94 which is provided with a central bore 95 into which is received the shank 93. The top portion of the shank 93 is provided with an upwardly directed integral threaded stud 96 receiving thereabout a clamping ring or washer 97 which is in contact with the top surface of the test shaft 94 and which, by reason of a nut 98 received on the outer end portion of the threaded stud 96, clamps the test shaft 94 against the upper radial annular surface of the shoulder 92. Thus the apparatus 10 is provided with a test shaft 94 of substantial outside diameter which has received thereabout an oil seal 99 held in sealing engagement therewith by chuck jaws 39. In comparing Figs. 2 and 5, it will be noted that with the testing of a seal 99 having a greater inside diameter, thereby necessitating the use of a test shaft 94 of greater outside diameter, the intermediate vertical clamping faces 51 of the jaws 39 are used to hold the seal 99.

In Fig. 8 the adaptor shaft including the shanks 90 and 93 and the annular shoulder 92 is illustrated prior to its assembly with the shaft 24 and prior to the placing of the test shaft 94 in its operative position. As may be readily seen, the shank 90 may be easily inserted within the recess 53 of the shaft 24 and threadedly advanced by the use of any suitable tool into tightly fastened relation, the threads carried by the bottom stud 91 and the tapped hole 54 of the shaft 24 being left-handed threads to promote tightening action between the shank 90 and the shaft 24 during clockwise rotation of the shaft 24. Following the clamping of the shank 90 within the recess 53, the test shaft 94 may be readily received about the shank 93, the washer 97 and nut 98 applied to clamp the same in its operative position. It should be further obvious that many different types of test shafts 94 may be received about the shank 93 and clamped thereto, these different forms of test shafts 94 varying with respect to their outside diameters depending upon the type of seal 99 under test.

Fig. 6 illustrates still a different type of test shaft 100 which is integrally attached to the upper end of an adaptor shank 101, the latter being similarly constructed as described in connection with the shanks 56 and 90. The test shaft 100 has a relatively small outer diameter thereby being adapted for the testing of a small size oil seal 102 held by the innermost vertical clamping faces 51 of the chuck jaws 39. In connection with the one-piece type of combined adaptor and test shaft shown in Fig. 6, it should be readily apparent that a complete set of such elements may be supplied with the apparatus 10, each of the elements having a different size test shaft portion 100. The uppermost end of the test shaft portion 100 is provided with oppositely positioned flat sides 103 adapted to receive the jaws of a wrench or other suitable tool for connecting the element with the shaft 24.

In Fig. 7 still another form of combined test shaft and adaptor element is shown which utilizes an enlarged test shaft portion 104 integrally formed with an adaptor shank 105, the latter being constructed similarly as described in connection with the shanks 56, 90 and 101. The enlarged test shaft portion 104 is adapted for having received thereabout an oil seal for testing the frictional torque of the seal in the same manner as described above. The top radial surface of the test shaft portion 104 is provided with spaced drilled holes 106 which are adapted to receive therein a pronged type of tool for tightening the adaptor shank 105 within the recess 53 of the shaft 24.

In considering the many different forms of test shafts and adaptor shanks which may be utilized in connection with the testing apparatus 10 of the present invention, it is apparent that the changing of the shafts to fit the testing needs is a very simple operation. Referring particularly to the test shaft 52 shown in Fig. 2, it will be noted that the bottom surface of the same is cone-shaped. The top edges of the vertical clamping faces 51 are rounded so as to allow the jaws 59 to be moved into contact with the cone-shaped bottom surface of the test shaft 52 to wedge the same off the cone-shaped adaptor shank 57 when it is desired to change the size of test shaft in use.

By concentrically mounting the chuck 28 relative to the shaft 24 and the test shaft carried thereby, the convenience of loading and unloading with respect to not only the test object but also the changing of the test shaft is greatly enhanced. Still further, the concentricity established reduces the influence of friction on the measured quantity when utilizing the apparatus 10. While it is impossible to eliminate friction established by the bearings 31, this friction is minimized by utilizing the dynamic or running friction of the bearings 31 instead of the higher and more variable static or standing friction of the same. Upon rotation of the shaft 24 the bearings 31 are placed in a dynamic condition and the friction developed by the same is substantially less than static or standing friction. The effect of this small amount of friction may be completely eliminated from the measurement obtained by adjusting the zero reading while the shaft 24 is turning with no test object or seal in test position. By turning the zero adjustment screw 83 through the opening 89 in the housing 11, the pointer arm 82 may be moved to coincide with a zero reading on the scale 81 carried on the outer periphery of the chuck 28. The eccentric shoulder 86 cooperates with the size of the aperture 88 in a pointer arm 82 to move the same in a clockwise or counterclockwise direction about the pivot point defined by the bolt 84. By obtaining zero adjustment in this manner compensation is made for the dynamic friction of the bearings 33 and the reading on the scale is solely that of seal friction.

The torque-measuring torsion springs 66 and 73 are mounted to provide a wide range of continuously variable, adjustable calibrations while allowing the utilization of an inexpensive commercial form of spring. By providing the studs 77 and 79 with means to allow the adjustment of the same in a vertical direction the springs of variable active length or number of turns may be used to thereby provide a wide range of continuously variable calibrations. As previously described, the vertical leg portion 75 of the bracket 74 is provided with a vertically extending slot 76 within which the studs 77 and 79 are slidable. The nuts 78 and 80 clamp the studs 77 and 79 in the position desired within the slot 76. By raising or lowering the studs 77 and 79, the length of the springs 66 and 73 used may vary considerably. Thus an inexpensive commercial type of torsion spring may be utilized with ready adjustment for manufacturing tolerances and, consequently, the expense and inconvenience of utilizing a non-adjustable precision spring are eliminated. While the use of two springs 66 and 73 has been illustrated, it should be understood that any number of springs may be used depending upon the type of testing desired. In many instances it is considered necessary merely to use a single spring, namely, spring 66 and with this single spring the test apparatus has been found to be extremely accurate. Spring calibration can be checked conveniently with weights on a cord wrapped around the chuck 28 or with a torque wrench or similar calibrator. Since the torsional resistance of the spring 66 or 73 is directly proportional to its active length, a correction of one-tenth of a scale division at the maximum scale reading requires a change of spring length of about three-tenths of an inch. Much finer adjustments than this are practical.

While the apparatus of the present invention has been described in connection with the testing of oil seals and the like, it should be understood that other test objects may be readily evaluated. For example, for purposes of quality control the apparatus may be used in testing bearings, slip clutches, overload releases and other types of similar elements.

Obviously many modifications and variations of the invention as hereinbefore set forth may be made without departing from the spirit and scope thereof, and therefore only such limitations should be imposed as are indicated in the appended claims.

I claim:

1. A radial seal friction testing apparatus including a housing having a vertical shaft therein extending through a top portion thereof, a chuck having radially directed adjustable jaw means received concentrically about said shaft and supported on said shaft by bearing means, said chuck extending outwardly of the top portion of said housing for ready access thereto, resilient means connected to said chuck to resist the turning of the same with said shaft upon rotation of the latter and the clamping of a seal by said jaw means in engagement with said shaft, adjustment means connected to said resilient means to vary the effectiveness of said resilient means for calibration of said apparatus, drive means for rotating said shaft, and indicator means for determining the extent of movement of said chuck against said resilient means.

2. A radial seal friction testing apparatus including a housing having a vertical shaft therein extending through a top portion thereof, a chuck having a radially directed adjustable jaw means received concentrically about said shaft and supported on said shaft by bearing means, said chuck extending outwardly of the top portion of said housing for ready access thereto, resilient means connected to said chuck to resist the turning of the same with said shaft upon rotation of the latter and the clamping of a seal by said jaw means in engagement with said shaft, said resilient means being in the form of a coil spring received about said shaft below said chuck and one end of which is attached to said chuck and the other end of which is fixed independent of said shaft and said chuck, adjustment means fixing the independent end of said spring, said bearing means providing a dynamic friction condition for overcoming by said spring in restraining substantial movement of said chuck with said shaft, drive means for rotating said shaft, and indicator means for determining the extent of movement of said chuck against said resilient means.

3. A radial seal friction testing apparatus including a housing having a vertical main shaft therein extending through a top portion thereof, a chuck having radially directed adjustable jaw means received concentrically about said main shaft and supported thereon by bearing means, said chuck extending outwardly of the top portion of said housing, the upper end portion of said main shaft being centrally recessed and receiving therein a removable shank carrying on its outer end outwardly of the end of said main shaft a test shaft about which is adapted to be received a seal to be tested, resilient means connected to said chuck to resist the turning of the same with said main shaft upon rotation of the latter and the clamping of a seal by said jaw means in engagement with said test shaft, drive means for rotating said shaft, and indicator means for determining the extent of movement of said chuck against said resilient means.

4. A radial seal friction testing apparatus including a housing having a vertical main shaft therein extending through a top portion thereof, a chuck having radially directed adjustable jaw means received concentrically about said main shaft and supported thereon by bearing means, said chuck extending outwardly of the top portion of said housing, the upper end portion of said main shaft being centrally recessed and receiving therein a removable shank carrying on its outer end outwardly of the end of said main shaft a test shaft about which is adapted to be received a seal to be tested, said test shaft and the recessed portion of said main shaft being cooperatively cone-shaped to provide wedging engagement therebetween and being further threadedly interengaged at end portions thereof, resilient means connected to said chuck to resist the turning of the same with said main shaft upon rotation of the latter and the clamping of a seal by said jaw means in engagement with said test shaft, drive means for rotating said shaft, and indicator means for determining the extent of movement of said chuck against said resilient means.

5. A radial seal friction testing apparatus including a housing having a vertical main shaft therein extending through a top portion thereof, a chuck having radially directed adjustable jaw means received concentrically about said main shaft and supported thereon by bearing means, said chuck extending outwardly of the top portion of said housing, the upper end portion of said main shaft being centrally recessed and receiving therein a removable shank carrying on its outer end outwardly of the end of said main shaft a test shaft about which is adapted to be received a seal to be tested, said test shaft and the recessed portion of said main shaft being cooperatively cone-shaped to provide wedging engagement therebetween and being further threadedly interengaged at end portions thereof, resilient means connected to said chuck to resist the turning of the same with said main shaft upon rotation of the latter and the clamping of a seal by said jaw means in engagement with said test shaft, the outer peripheral surface of said chuck being provided with indicia having associated therewith indicator means carried separately of said chuck whereby the extent of movement of said chuck is readily determinable, said indicator means being in the form of an adjustable pointer arm to allow calibration of said apparatus, and means for rotating said shafts within said housing.

6. A radial seal friction testing apparatus including a housing having a vertical main shaft therein extending through a top portion thereof, a chuck having radially directed adjustable jaw means received concentrically about said main shaft and supported thereon by bearing means, said chuck extending outwardly of the top portion of said housing, the upper end portion of said main shaft being centrally recessed and receiving therein a removable shank carrying on its outer end outwardly of the end of said main shaft a test shaft about which is adapted to be received a seal to be tested, said test shaft and the recessed portion of said main shaft being cooperatively cone-shaped to provide wedging engagement therebetween and being further threadedly interengaged at end portions thereof, resilient means connected to said chuck to resist the turning of the same with said main shaft upon rotation of the latter and the clamping of a seal by said jaw means in engagement with said test shaft, said resilient means being in the form of a coil spring one end of which is attached to said chuck and the other end of which is fixed independent of said main shaft and said chuck, adjustment means fixing the independent end of said spring, said bearing means providing a dynamic friction condition for overcoming by said spring in restraining substantial movement of said chuck with said main shaft, the outer peripheral surface of said chuck being provided with indicia having associated therewith indicator means carried separately of said chuck whereby the extent of movement of said chuck is readily determinable, said indicator means being in the form of an adjustable pointer arm to allow calibration of said apparatus, and means for rotating said shafts within said housing.

7. A friction testing apparatus including a shaft concentrically received through a test object holding means supported on said shaft by bearing means which provide for independent rotational movement of said shaft and said holding means relative to one another, said holding means including adjustable test object clamping means for clamping a test object against said shaft, said holding means being held against substantial movement with said shaft by resilient means connected thereto and anchored independently of said shaft, adjustment means connected to said resilient means to vary the effectiveness of said resilient means for calibration of said apparatus, and drive means for rotating said shaft.

8. The friction testing apparatus of claim 7 wherein said resilient means is in the form of a coil spring mounted about said shaft and having one end thereof attached to said test object holding means with the other end thereof fixed independent of said shaft and said holding means.

9. The friction testing apparatus of claim 8 wherein said other end of said spring is fixed by said adjustment means which functions to vary the active length of said spring.

References Cited in the file of this patent

UNITED STATES PATENTS

| | | |
|---|---|---|
| 2,332,972 | Johnson | Oct. 26, 1943 |
| 2,486,280 | Hausmann | Oct. 25, 1949 |
| 2,607,219 | Millard et al. | Aug. 19, 1952 |
| 2,779,187 | Stewart | Jan. 29, 1957 |
| 2,785,566 | Mims | Mar. 19, 1957 |

FOREIGN PATENTS

| | | |
|---|---|---|
| 320,614 | Great Britain | Oct. 16, 1929 |